Patented May 27, 1941

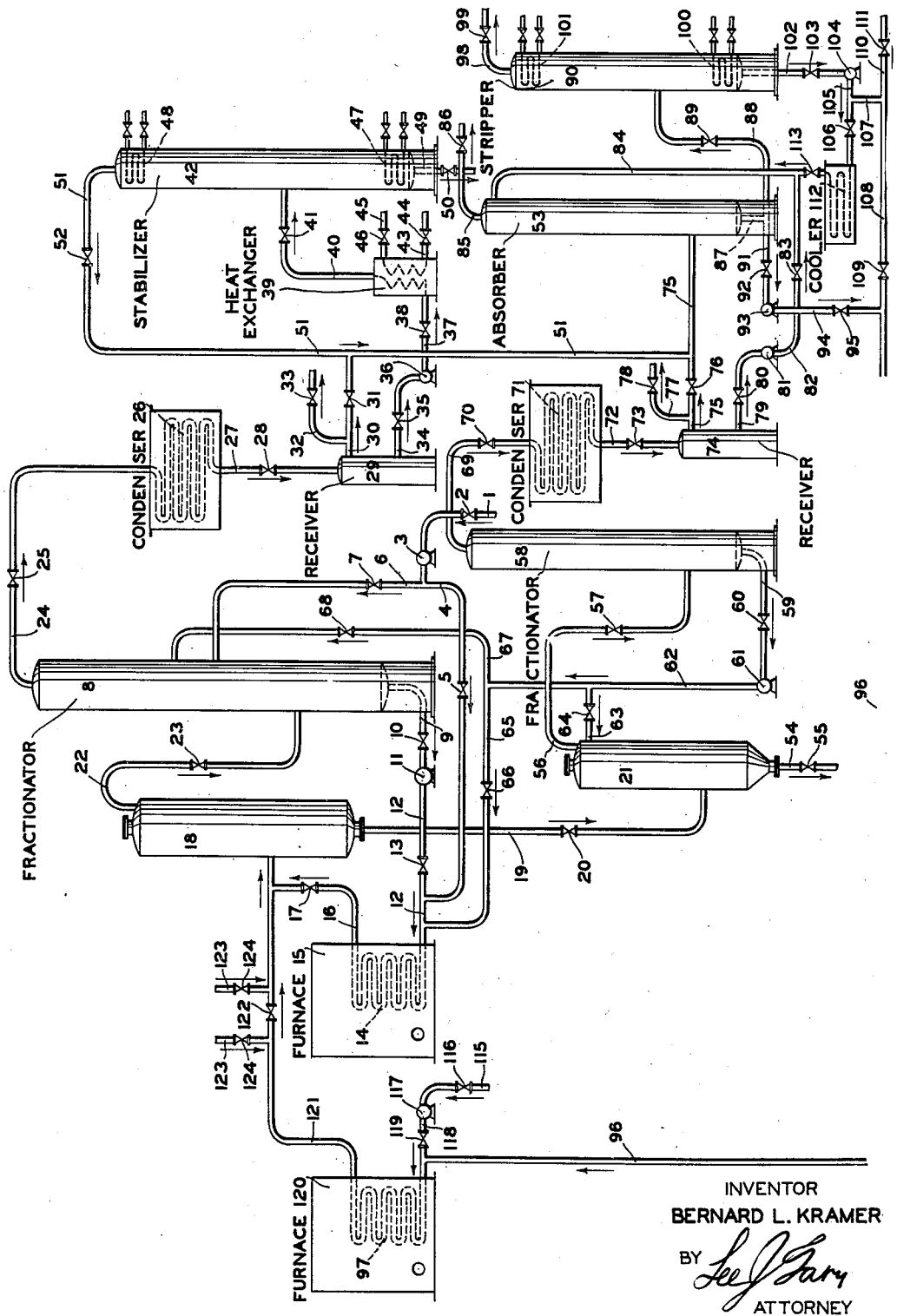

2,243,315

UNITED STATES PATENT OFFICE 2,243,315

CONVERSION OF HYDROCARBON OILS

Bernard L. Kramer, Chicago, Ill., assignor to Universal Oil Products Company, Chicago, Ill., a corporation of Delaware Application December 30, 1937, Serial No. 182,432

11 Claims. (Cl. 196—9)

My invention relates to hydrocarbon oil conversion and more particularly has reference to the recovery of polymerizable normally gaseous olefins from the products of cracking processes.

The value of propene and butene fractions as polymerization stock, wherefrom liquids boiling within the range of gasoline and of high antiknock value may be produced, is now well recognized. Substantial quantities of these high-boiling normally gaseous olefins are contained in the normally gaseous products resulting from the pyrolytic conversion of hydrocarbon oils and modern cracking and reforming systems, operated for the production of high yields of good antiknock gasoline, are the largest sources of propene and butenes. It is now common practice to condense the desired motor fuel product of such cracking and reforming operations in the presence of the gaseous products of the process at temperature and pressure conditions which result in the solution of a substantial quantity of the heavy components of the gases, such as propane, butane and the corresponding olefins, as well as some lower boiling gases, stabilize the distillate to the desired vapor pressure by liberating regulated quantities of the dissolved gases therefrom and recover the liberated gases, which contain a high percentage of propene and butenes, as polymerization stock.

Another method whereby a greater proportion of the total propene and butene fractions produced in the cracking operation may be recovered as polymerization stock, involves absorption of the high-boiling fractions of the gases liberated from the distillate by stabilization and the gases previously separated from the distillate in a suitable absorber oil which may be stripped to recover the absorbed normally gaseous products as polymerization stock or which, in some instances, is supplied together with the gases which it absorbs to a cracking coil operated under conditions which result in polymerization of the olefinic gases and simultaneous pyrolytic conversion of the absorber oil.

With either of the above outlined methods of recovery, the normally gaseous polymerization stock will include a high proportion of paraffinic gases, such as propane and butane, as well as an appreciable quantity of gases which contain two and less carbon atoms to the molecule which are relatively inert to polymerization. To overcome this objection and recover a polymerization stock containing a higher percentage of the desired readily polymerizable olefins, the present invention provides for the use of an absorber oil which, due to its highly olefinic nature, has a selective affinity for the olefinic components of the gases. This selective absorbent is a distillate resulting from the flash distillation of cracked liquid residue and may be derived, when desired, from a flash distilling step of the same cracking system wherein the gases to be absorbed are produced.

The invention contemplates either distillation or stripping of the enriched absorber oil to separate the desired normally gaseous olefins from its normally liquid components, whereby the former may be supplied, for example, to a suitable catalytic polymerization process, or the enriched absorber oil may be utilized as a portion or all of the charging stock for a relatively light oil cracking operation wherein its liquid components are cracked in the presence of the normally gaseous olefins and wherein the latter are polymerized, the result being a higher yield of good antiknock gasoline or a gasoline product of higher antiknock value as compared with that which can be produced from the absorber oil under the same conditions of temperature, pressure and conversion time but in the absence of said polymerizable normally gaseous olefins.

One specific embodiment of the process of the invention comprises cracking an oil of relatively high-boiling characteristics at elevated temperature and superatmospheric pressure, separating the resulting vaporous and liquid products at substantial superatmospheric pressure, fractionating said vaporous products to form a reflux condensate which is returned to said cracking operation, subjecting the fractionated vapors and gases of the desired end-boiling point to condensation, separating the resulting distillate, containing dissolved gases, from the remaining undissolved and uncondensed gases, stabilizing the distillate to reduce its vapor pressure to the desired degree by liberating regulated quantities of dissolved normally gaseous products therefrom, recovering the stabilized distillate, supplying the gases liberated from the distillate by said stabilization and said undissolved and uncondensed gases previously separated from the unstabilized distillate to an absorber, appreciably further vaporizing said liquid conversion products in a zone of substantially reduced pressure relative to that wherein they are separated from said vaporous products, separately fractionating the vapors thus evolved from said liquid products to condense their high-boiling components as reflux condensate, separately condensing the resulting fractionated vapors to form a light distillate of highly olefinic nature, supplying the latter in regulated quantities to the absorber wherein it intimately contacts the gaseous products supplied to this zone and selectively absorbs desirable high-boiling olefinic components thereof, such as propene and butenes, removing the remaining unabsorbed gases from the system, supplying the resulting enriched absorber oil to a separate conversion step of the system wherein it is heated to a high oil cracking temperature at substantial superatmospheric pressure regulated to produce high yields of good antiknock gasoline from both the liquid and normally gaseous olefinic components of the enriched absorber oil and commingling the resulting products with the products of the first mentioned cracking operation.

Another specific embodiment of the process of the invention comprises heating hydrocarbon oil to cracking temperature at substantial superatmospheric pressure, separating the resulting vaporous and liquid conversion products at substantial superatmospheric pressure, fractionating said vaporous conversion products to form a reflux condensate, returning the latter to the cracking operation, subjecting fractionated vapors and gases of the desired end-boiling point to condensation, separating the resulting distillate which contains dissolved gases, from the remaining uncondensed and undissolved gases, stabilizing the distillate to reduce its vapor pressure to the desired degree by liberating regulated quantities of dissolved normally gaseous products therefrom, supplying the gases liberated from the distillate by said stabilization and said uncondensed and undissolved gases previously separated from the unstabilized distillate to an absorber, appreciably further vaporizing said liquid conversion products in a zone of substantially reduced pressure relative to that wherein they are separated from said vaporous products, separately fractionating the resulting vapors to condense their high-boiling components as reflux condensate, returning the latter to the cracking operation for further treatment, condensing fractionated vapors of the last mentioned fractionating step to form a light distillate of highly olefinic nature, supplying the latter in regulated quantities to said absorber wherein it intimately contacts the gases supplied to this zone and selectively absorbs high-boiling olefinic components thereof, such as propene and butenes, subsequently liberating the dissolved gases from the resulting enriched absorber oil and recovering the same separate from the gases remaining unabsorbed in said absorber and cooling and returning regulated quantities of the stripped absorber oil, from which said dissolved gases have been liberated, to the absorption step as additional absorber oil.

The accompanying diagrammatic drawing illustrates one specific form of apparatus in which the process of the invention may be conducted and the following description of the drawing includes a more detailed description of the two alternative but non-equivalent methods of operation, above outlined, as well as various modifications of these alternative methods.

Referring to the drawing, charging stock for the process which may be any desired type of oil, such as crude petroleum, topped crude, fuel oil, gas oil or the like, is supplied through line 1 and valve 2 to pump 3 wherefrom it may be fed through line 4, valve 5 and line 12 to heating coil 14 or it may be supplied, all or in part, through line 6 and valve 7 into fractionator 8. Any charging stock thus supplied to fractionator 8 will commingle with the vaporous products undergoing fractionation in this zone, serve to partially cool the same and assist their fractionation and the components of the charging stock which correspond in boiling characteristics to the reflux condensate formed in fractionator 8 will commingle therewith in the lower portion of the fractionator, the commingled materials being supplied through line 9 and valve 10 to pump 11 wherefrom they are fed through line 12 and valve 13 to conversion in heating coil 14.

Heating coil 14 is disposed within a furnace 15 by means of which the required heat is supplied to the oil passing through this zone to heat it to the desired cracking temperature, preferably at a substantial superatmospheric pressure. The resulting hot conversion products are discharged from heating coil 14 through line 16 and valve 17 into chamber 18.

Chamber 18 functions as a zone of separation for vaporous and liquid conversion products. It is preferably operated at a substantial superatmospheric pressure and, although not indicated in the drawing, is insulated to conserve heat so that appreciable continued cracking of the hot conversion products supplied to this zone is accomplished therein. Chamber 18 may, however, when desired, be operated at a substantially reduced pressure relative to that employed in one or both of the communicating heating coils.

Vaporous and liquid conversion products are separately removed from the upper and lower portions, respectively, of chamber 18, the liquid products being directed through line 19 and valve 20 into flash distilling chamber 21, while the vaporous products are directed through line 22 and valve 23 to fractionation in fractionator 8.

The components of the vaporous products supplied to fractionator 8 which boil above the range of the desired light distillate product of this stage of the system are condensed within the fractionator as reflux condensate which is returned, as previously described, to further cracking in heating coil 14.

Fractionated vapors of the desired end-boiling point and the normally gaseous products of the cracking operation are directed from the upper portion of fractionator 8 through line 24 and valve 25 to cooling and condensation in condenser 26. The resulting distillate, which contains a substantial quantity of dissolved gases, and the remaining uncondensed and undissolved normally gaseous products, are directed from condenser 26 through line 27 and valve 28 to collection and separation in receiver 29. The uncondensed and undissolved gases are withdrawn from the receiver through line 30 and preferably are directed through valve 31 in this line and through lines 51 and 75 to absorber 53, or they may be removed, all or in part, from the system to storage or elsewhere, as desired, through line 32 and valve 33. The gas-containing distillate collected in receiver 29 is directed through line 34 and valve 35 to pump 36 wherefrom it is fed through line 37, valve 38, heat exchanger 39, line 40 and valve 41 into stabilizer 42.

When desired, regulated quantities of the distillate collected in receiver 29 may be recirculated by well known means, not illustrated, to the upper portion of fractionator 8 to serve as a cooling and refluxing medium in this zone.

The function of heat exchanger 39 is to reheat and thereby effect substantial vaporization of the distillate supplied to the stabilizer. This is accomplished, in the case here illustrated, by passing a suitable heating medium in indirect heat exchange with the distillate passing through heat exchanger 39 by means of lines 43 and 45 containing the respective valves 44 and 46. Any other well known manner of reheating the distillate to be stabilized may be employed within the scope of the invention and the required heat may be supplied to the distillate either within stabilizer 42 or prior to its introduction into this zone or partially in both manners.

The purpose of stabilizer 42 is to liberate regulated quantities of the dissolved gases from the distillate and thereby reduce its vapor pressure to the desired degree. In order to control rectification of the distillate in stabilizer 42, reboiling means such as, for example, a closed coil 47, through which a suitable heating medium is passed, is provided within the lower portion of the stabilizer and suitable cooling means, such as a closed coil 48, through which any suitable cooling medium is passed, is provided in the upper portion of the stabilizer. Any other well known method and means of accomplishing these steps may, of course, be employed within the scope of the invention. The reboiled and stabilized distillate is withdrawn from the lower portion of the stabilizer through line 49 and valve 50 and may be directed to cooling and storage or to any desired further treatment, this material being employed, when desired, as a heating medium in heat exchanger 39 by well known means, not illustrated. The normally gaseous products liberated from the distillate in stabilizer 42 are directed from the upper portion of this zone through line 51, valve 52 and line 75 to absorber 53.

The liquid conversion products supplied from chamber 18 to chamber 21, as previously described, are appreciably further vaporized in the latter zone, in which a substantially reduced pressure relative to the pressure utilized in chamber 18 is employed. The resulting vaporous products and non-vaporous liquid residue are separated in chamber 21. The residual liquid is removed from the lower portion of this zone through line 54 and valve 55 to cooling and storage or elsewhere, as desired. The vaporous products are directed from the upper portion of chamber 21 through line 56 and valve 57 to fractionation in fractionator 58. The upper portion of chamber 21 is preferably provided with suitable rough fractionating means, not illustrated, by means of which the desired separation of vaporous and liquid products is accomplished in this zone, and preferably a suitable cooling and refluxing medium is introduced into the upper portion of the flash distilling chamber. In the case here illustrated, reflux condensate formed in fractionator 58 may be returned in regulated quantities, by means which will be later described, through line 63 and valve 64 into the upper portion of chamber 21 for this purpose, although the invention is not limited to the use of this particular material as a cooling and refluxing medium in the flash distilling chamber nor to the use of any cooling and refluxing medium in this zone.

The components of the vaporous products supplied to fractionator 58 which boil above the range of the desired light distillate product of this stage of the system are condensed therein as reflux condensate. This material is directed from the lower portion of the fractionator through line 59 and valve 60 to pump 61 by means of which it is fed through line 62 and may be directed therefrom in regulated quantities, as previously mentioned, through line 63 and valve 64 into the upper portion of chamber 21, while the remaining portion may be supplied, all or in part, from line 62, valve 66 and line 12 direct to heating coil 14 or through line 67 and valve 68 to fractionator 8 wherein it commingles with the vaporous conversion products supplied to this zone from chamber 18 and is subjected to fractionation therewith, in the manner previously described.

Fractionated vapors of the desired end-boiling point are directed from the upper portion of fractionator 58 through line 69 and valve 70 to cooling and condensation in condenser 71. The resulting distillate and uncondensed normally gaseous products are directed from condenser 71 through line 72 and valve 73 to collection and separation in receiver 74. The uncondensed gases may be directed from receiver 74 through line 75 and valve 76 to absorber 53, or they may be released, all or in part, from the system to storage or elsewhere, as desired, through line 77 and valve 78.

When desired, regulated quantities of the distillate collected in receiver 74 may be recirculated by well known means, not illustrated, to the upper portion of fractionator 58 to serve as a cooling and refluxing medium in this zone.

Preferably, fractionation is so controlled in fractionator 58 that the distillate collected in receiver 74 is an oil of relatively low-boiling characteristics and contains at least a substantial quantity of materials boiling within the range of gasoline, although it may also include somewhat higher boiling materials such as heavy naphtha fractions, kerosene or kerosene distillate and the like. This distillate will contain a relatively high percentage of unsaturated compounds and, due to its boiling characteristics and highly unsaturated nature, has been found to be a highly suitable absorber oil for recovering desirable high-boiling components, such as propene and butenes, from the normally gaseous products of the process. The invention therefore provides for directing the distillate collected in receiver 74 through line 79 and valve 80 to pump 81 wherefrom it is directed through line 82, valve 83 and line 84 into the upper portion of absorber 53. It passes downwardly through the absorber in intimate countercurrent contact with the normally gaseous products supplied to this zone, as previously described, and absorbs desirable high-boiling components, such as propene and butenes therefrom.

The unabsorbed gases are released from the upper portion of absorber 53 through line 85 and valve 86 wherefrom they may be directed to storage or elsewhere, as desired. The enriched absorber oil is withdrawn from the lower portion of the absorber through line 87 and may be directed, all or in part, through line 88 and valve 89 to stripper 90 or it may be directed, all or in part, through line 91 and valve 92 to pump 93 and supplied therefrom through line 94, valve 95 and line 96 to heating coil 97.

When all or a portion of the enriched absorber oil from absorber 53 is supplied to distilling or stripping column 90, it is subsequently freed in this zone of the gases which it has absorbed, the latter being removed from the upper portion of column 90 through line 98 and valve 99 to storage or elsewhere, as desired, this product consisting principally of relatively high-boiling normally gaseous materials and containing a high percentage of readily polymerizable olefins, such as propene and butenes. Preferably, a suitable reboiling coil 100 and a suitable cooling coil 101 are provided in the lower and upper portions, respectively, of column 90 to effect substantially complete stripping of the enriched absorber oil and prevent the inclusion of normally liquid products in the overhead vaporous stream from this zone. The stripped absorber oil is withdrawn from the lower portion of column 90 and directed through line 102 and valve 103 to pump 104 by means of which it may be fed, all or in part, through line 107, line 108, valve 109 and line 96 to heating coil 97, or all or a regulated portion of the stripped absorber oil may be removed from the system through line 110 and valve 111. Preferably, however, regulated quantities of the stripped absorber oil are returned from pump 104 through line 105, valve 106, cooler 112, valve 113 and line 84 to the upper portion of absorber 53, whereby to augment to any desired degree the quantity of absorber oil supplied to this zone from receiver 74.

Heating coil 97 is a relatively light oil cracking or reforming coil, the use of which is optional in the present process. When this zone is employed, it may be devoted to the treatment of enriched absorber oil from absorber 53 or stripped absorber oil from column 90 or suitable relatively light distillate from an external source or any desired combination of these various materials. When light distillate from an external source is employed, it may be supplied to heating coil 97 by means of line 115, valve 116, pump 117, line 118 and valve 119 and this distillate may comprise, for example, straight-run gasoline or other materials of poor antiknock value boiling within the range of gasoline, naphtha, kerosene distillate or any desired mixture of such materials.

When polymerizable gases, such as propene and butenes, are included in the distillate supplied to heating coil 97, the conditions of treatment which the materials supplied to this zone are afforded therein, are regulated to effect polymerization of the olefinic gases and also to crack or reform the distillate and thereby produce high yields of good antiknock gasoline.

The heat required for the desired treatment of the materials supplied to heating coil 97 is supplied from furnace 120 and the heated products are discharged from the heating coil through line 121 and are introduced through valve 122 in this line into chamber 18, preferably after being cooled sufficiently as they pass through line 121 to prevent their excessive further conversion. This cooling may be accomplished in part by substantially reducing the pressure imposed upon the stream of heated products as they pass through valve 122 and by commingling the less highly heated products from heating coil 14 therewith. Any required additional cooling may be accomplished, for example, by introducing a suitable cooling medium into line 121 on either or both sides of valve 122 through lines 123 controlled by valves 124. The cooling material thus utilized may comprise, for example, reflux condensate from fractionator 8 or reflux condensate from fractionator 58 or selective relatively low-boiling fractions of either of these reflux condensates or any other suitable relatively low-boiling oil derived from within the system or from any desired external source.

The preferred range of operating conditions which may be employed in an apparatus of the character illustrated and above described, to accomplish the desired results, may be approximately as follows: The temperature employed at the outlet of heating coil 14 may range, for example, from 850 to 950° F., preferably with a superatmospheric pressure at this point in the system of from 100 to 500 pounds or more, per square inch. Chamber 18 may be operated at substantially the same or somewhat lower superatmospheric pressure and the pressure employed in chamber 18 may be substantially equalized or reduced in the succeeding fractionating, condensing and collecting equipment. The flash distilling chamber is preferably operated at a substantially reduced pressure relative to that employed in chamber 18, the reduced pressure ranging, for example, from a superatmospheric pressure of 75 pounds, or thereabouts, per square inch, down to substantially atmospheric pressure. The pressure employed in chamber 21 may be substantially equalized or reduced in the succeeding fractionating, condensing and collecting equipment. The stabilizer is preferably operated at a superatmospheric pressure of the order of 100 to 250 pounds, or thereabouts, per square inch, and substantially the same or lower superatmospheric pressure may be employed in the absorber. When stripping column 90 is utilized, it is preferably operated at a substantially reduced pressure relative to that utilized in the absorber. Heating coil 97, when employed, may utilize an outlet temperature ranging, for example, from 900 to 1100° F., or thereabouts, and preferably a superatmospheric pressure of the order of 300 to 800 pounds, or more, per square inch, is employed at the outlet of heating coil 97. Preferably, the products discharged from heating coil 97 are cooled prior to their introduction into chamber 18 to a temperature of the order of 650 to 850° F., or thereabouts.

As an example of one specific operation utilizing the features of the invention in an apparatus, such as illustrated and above described, the charging stock is a topped crude of approximately 30° A. P. I. gravity which is supplied to fractionator 8 and substantially all of which is fed therefrom, together with the reflux condensate formed in this zone, to heating coil 14. A cracking temperature of approximately 920° F. and a superatmospheric pressure of approximately 225 pounds per square inch is employed at the outlet of heating coil 14 and substantially the same pressure is employed in chamber 18 and in the succeeding fractionating, condensing and collecting equipment. The stabilizer is operated at a superatmospheric pressure of approximately 200 pounds per square inch and the gases liberated from the distillate in this zone are supplied to absorber 53 which is operated at a superatmospheric pressure of approximately 175 pounds per square inch. Chamber 21, to which liquid products from chamber 18 are supplied, is operated at a superatmospheric pressure of approximately 45 pounds per square inch and the final residual liquid product of the process is recovered from this zone. Substantially the same pressure is employed in the succeeding fractionating, condensing and collecting equipment, the reflux condensate from fractionator 58 being returned, in part, to the upper portion of chamber 21 and, in part, to fractionator 8. The distillate recovered in receiver 74 contains approximately 10% of the materials boiling up to 140° F. and has an end-boiling point of approximately 550° F. This distillate is utilized as absorber oil in absorber 53 and the gases removed from the upper portion of this zone consist principally of propane and lower boiling hydrocarbons, substantially all of the butenes, a major portion of the butanes and at least a substantial portion of the propene being absorbed in this zone. The resulting enriched absorber oil is supplied from absorber 53 to column 90 which is operated at substantially atmospheric pressure and wherein the absorber oil is substantially freed of dissolved gases. Gases liberated from column 90 are recovered for use as polymerization stock and the stripped absorber oil is, in part, cooled and returned to the upper portion of the absorber and, in part, supplied to heating coil 97. A Pennsylvania naphtha from an external source is also supplied to heating coil 97 in an amount approximately equivalent in volume to the topped crude charging stock. A conversion temperature of approximately 990° F. and a superatmospheric pressure of approximately 500 pounds per square inch is employed at the outlet of heating coil 97 and the heated products discharged from this zone are cooled to a temperature of approximately 825° F. prior to their introduction into chamber 18. This operation will produce per barrel of total charging stock (including the topped crude and the Pennsylvania distillate) approximately 64% of 390° F. end-point gasoline having an octane number of approximately 72 as determined by the motor method, approximately 17.5% of good quality liquid residue suitable as fuel oil and approximately 240 cu. ft. of relatively heavy normally gaseous products which, together with the olefinic gases included in the stabilized distillate, comprise substantially all of the butenes produced in the cracking and reforming operations and a substantial portion of the propene. These relatively heavy gases contain approximately 40% by weight of propene and butene fractions and are highly desirable as charging stock for a well known catalytic polymerization process. The only other product of the process is the gaseous product removed from the upper portion of the absorber which consists principally of propane and lower boiling gases.

I claim as my invention:

1. A conversion process which comprises cracking hydrocarbon oil under pressure and separating the resultant products under pressure into vapors and unvaporized oil, fractionating and condensing the vapors to form a light distillate and separating the latter from normally gaseous hydrocarbons, flash distilling said unvaporized oil by pressure reduction, fractionating the resultant flashed vapors independently of the first-mentioned vapors to condense heavier fractions thereof, finally condensing the fractionated flashed vapors to form a highly olefinic distillate containing a substantial proportion of gasoline boiling hydrocarbons, scrubbing normally gaseous hydrocarbons formed by the cracking and separated from said light distillate with an absorber oil consisting essentially of highly olefinic distillate resulting from the final condensation of said fractionated flashed vapors to absorb in the olefinic distillate polymerizable olefins present in said gaseous hydrocarbons, and separately removing the enriched absorber oil and the unabsorbed gases from the scrubbing step.

2. The process as defined in claim 1 further characterized in that said polymerizable olefins are separated from the enriched absorber oil and recovered as a product of the process.

3. The process as defined in claim 1 further characterized in that said enriched absorber oil is subjected to conversion conditions adequate to polymerize a substantial portion of the gaseous olefins absorbed therein.

4. The process as defined in claim 1 further characterized in that the normally gaseous hydrocarbons supplied to the scrubbing step are separated from said light distillate by stabilization of the latter.

5. A process such as defined in claim 1, wherein enriched absorber oil resulting from said absorption step is heated to a high oil cracking temperature at superatmospheric pressure under conditions controlled independently of those employed in the first mentioned cracking operation and regulated to polymerize a substantial quantity of said propene and butene components of the enriched absorber oil and simultaneously convert the normally liquid components of the absorber oil into high yields of good antiknock gasoline.

6. A process such as defined in claim 1, wherein enriched absorber oil removed from said absorption step is subsequently substantially freed of normally gaseous components, the thus liberated gases, which comprise a substantial portion of readily polymerizable olefins comprising propene and butenes, recovered as a separate product of the process, and regulated quantities of the resulting stripped absorber oil cooled and returned to the absorption step.

7. A process for the treatment of hydrocarbon oils, which comprises heating an oil to cracking temperature at substantial superatmospheric pressure in a heating coil, introducing the resulting products into an enlarged separating chamber also maintained at a substantial superatmospheric pressure, separately removing vaporous and liquid conversion products from said enlarged chamber, fractionating said vaporous products to condense their high-boiling components as reflux condensate, returning reflux condensate formed by said fractionation to the heating coil for further cracking, subjecting fractionated vapors and gases of the desired end-boiling point to condensation to form a distillate, containing substantial quantities of dissolved normally gaseous products, stabilizing said distillate to reduce its vapor pressure to the desired degree by liberating regulated quantities of said dissolved normally gaseous products therefrom, recovering the stabilized distillate, supplying liquid products removed from said enlarged separating chamber to a reduced pressure vaporizing and separating chamber wherein they are appreciably further vaporized, separately removing resulting evolved vapors and non-vaporous residue from said reduced pressure vaporizing and separating chamber, separately fractionating said evolved vapors to form another reflux condensate, separately subjecting fractionated vapors of the desired end-boiling point resulting from the last mentioned fractionating step to condensation to form another light distillate of highly unsaturated nature, contacting the latter in an absorber with the gases liberated from the first mentioned distillate by said stabilization thereof, thereby absorbing desirable high-boiling components of said liberated gases comprising propene and butenes, in said highly olefinic distillate, removing the unabsorbed more highly paraffinic gases from the absorption step, separately removing the resulting enriched absorber oil from the absorption step and substantially stripping the same of its normally gaseous components, recovering the latter, which contain a high proportion of readily polymerizable olefins comprising propene and butenes, as a separate product of the process, and cooling and returning regulated quantities of the resulting stripped absorber oil to the absorption step.

8. A process for the treatment of hydrocarbon oils, which comprises heating an oil to cracking temperature at substantial superatmospheric pressure in a heating coil, introducing the resulting products into an enlarged separating chamber also maintained at a substantial superatmospheric pressure, separately removing vaporous and liquid conversion products from said enlarged chamber, fractionating said vaporous products to condense their high-boiling components as reflux condensate, returning reflux condensate formed by said fractionation to the heating coil for further cracking, subjecting fractionated vapors and gases of the desired end-boiling point to condensation to form a distillate containing substantial quantities of dissolved normally gaseous products, stabilizing said distillate to reduce its vapor pressure to the desired degree by liberating regulated quantities of said dissolved normally gaseous products therefrom, recovering the stabilized distillate, supplying liquid products removed from said enlarged separating chamber to a reduced pressure vaporizing and separating chamber wherein they are appreciably further vaporized, separately removing resulting evolved vapors and non-vaporous residue from said reduced pressure vaporizing and separating chamber, separately fractionating said evolved vapors to form another reflux condensate, separately subjecting fractionated vapors of the desired end-boiling point resulting from the last mentioned fractionating step to condensation to form another light distillate of highly unsaturated nature, contacting the gases liberated from the first mentioned distillate by said stabilization thereof with an absorber oil consisting essentially of highly unsaturated light distillate formed by the last-mentioned condensation, thereby absorbing desirable high-boiling components of said liberated gases comprising propene and butenes, in said highly olefinic distillate, removing the unabsorbed more highly paraffinic gases from the absorption step, supplying resulting enriched absorber oil, which contains a high percentage of the propene and butene fractions produced by said cracking operation to a separate heating coil, therein heating the same under conditions regulated to convert both its normally gaseous and normally liquid components into substantial yields of good antiknock gasoline, and commingling the latter with the gasoline boiling range products of the last mentioned cracking operation.

9. A process such as defined in claim 8, wherein reflux condensate resulting from the last mentioned fractionating step is returned to the first mentioned heating coil for further cracking.

10. A process such as defined in claim 8, wherein reflux condensate resulting from the last mentioned fractionating step and charging stock for the process, consisting of a relatively high-boiling oil, are cracked in the first mentioned heating coil together with reflux condensate formed in the first mentioned fractionating step.

11. A process such as defined in claim 8 wherein distillate from an external source, which contains at least a substantial quantity of poor antiknock gasoline fractions, is supplied to the last mentioned heating coil with said enriched absorber oil and therein cracked to produce additional high yields of good antiknock gasoline.

BERNARD L. KRAMER.